United States Patent Office 3,393,254
Patented July 16, 1968

3,393,254
PHOSPHATE POLYOLS AND METHOD FOR
THEIR PREPARATION
Robert J. Hartman, Southgate, and John T. Patton, Jr.,
Wyandotte, Mich., assignors to Wyandotte Chemicals
Corporation, Wyandotte, Mich.
No Drawing. Filed Feb. 24, 1964, Ser. No. 346,992
4 Claims. (Cl. 260—953)

ABSTRACT OF THE DISCLOSURE

Phosphate polyols having improved hydrolytic stability are prepared by adding phosphoric acid to an alkylene oxide in the liquid phase.

This invention is concerned with an improved process for the preparation of phosphate polyols from phosphoric acid and alkylene oxides. As used in the following specification and claims, the term "phosphate polyol" refers to esters of phosphoric acid containing terminal hydroxyl groups.

It is well known to prepare phosphate polyols by reaction of phosphoric acid with alkylene oxides. For example U.S. Patent 2,372,244 discloses the reaction of various acids of phosphorus with alkylene oxides to obtain phosphorus-bearing polyols. With the process described by said patent, an alkylene oxide is added to the acid at a temperature ranging from about −20 to 150° C. By reacting about 6 or more mols of propylene oxide with 1 mol of phosphoric acid, a symmetrical polyol containing primary hydroxyl groups is obtained. U.S. 3,094,549 discloses an improvement on the foregoing process which comprises carrying out the reaction in an inert solvent. With this latter process, alkylene oxide is added to phosphoric acid in an inert solvent medium. The patent states that by conducting the reaction in a solvent media, substantially neutral polyols are obtained with the addition of a minimum amount of alkylene oxide, i.e. not more than about 5 mols of alkylene oxide per mol of phosphoric acid.

Phosphate polyols have been found to be useful in imparting flame retardant properties to polyurethane materials. One outstanding application for these polyols is as constituents of rigid polyurethane foams which are to be used in the building industry. The terminal hydroxyl groups of the phosphate polyol react with NCO groups of an isocyanate to form a urethane linkage. Thus, the phosphate polyol becomes an integral part of the urethane composition.

For several reasons, these phosphate polyols have not been universally accepted for such purposes. In many applications and especially in the building industry, a premix formulation is reacted on site with a polyisocyanate to form the polyurethane foam. The major constitutents of such a premix formulation may include various polyols, conventional polyester and/or polyether polyols, a phosphate polyol, a catalyst for the urethane reaction, emulsifiers, blowing agents, etc. An absolute requisite is that premix components must be compatible and that the formulation has a reasonably long shelf life. Unfortunately, prior art phosphate polyols, for example those prepared by said Patent 2,372,244, have been found to be seriously wanting in this regard, especially in the presence of moisture.

It has been found that premix formulations containing prior art phosphate polyols have an extremely short shelf life in the presence of moisture in that with time their foamability properties are seriously reduced and in extreme situations are essentially totally lost. This problem has been found to stem from loss of catalyst activity due to reaction of the catalyst with free acid groups. The phosphate polyols, upon exposure to moisture, generate free acid groups which in turn react with the basic catalyst. The foamability can be restored only by adjustment of the catalyst level. In addition to representing an economic loss of catalyst, an additional problem of exactly how much new catalyst to add to restore the formulation to its original level is posed. Thus, foam characteristics may be subject to wide variations from batch to batch.

It is an object of the present invention to provide phosphate polyols having an exceptionally high resistance to the effect of moisture. A further object is to provide a method for preparing such polyols, said process being carried out in a relatively short time with the elimination of undersirable side products.

As pointed out above, with prior art processes for preparing phosphate polyols an alkylene oxide is slowly added to phosphoric acid. This procedure of adding alkylene oxide to the phosphoric acid is in accordance with well-established chemical procedure for reactions involving alkylene oxides. Alkylene oxides are known to rearrange violently and/or polymerize and must be handled with extreme caution. In discussing this problem, the article "Chemical Safety Data Sheet SD-38, Properties and Essential Information for Safe Handling and Use of Ethylene Oxide", Manufacturing Chemists Association, Inc., Washington, D. C. (1951), at p. 11 states:

"Ethylene oxide may rearrange and/or polymerize violently liberating large quantities of heat. A few of the most notable catalysts for this type of reaction are . . . acids and organic bases." Accordingly, the normal procedure adapted by the prior art when utilizing an alkylene oxide is to add the alkylene oxide to the second reactant, thereby always maintaining a minimum concentration of the oxide. In discussing an alkylene oxide reaction, column 9 of U.S. 2,425,845 states:

"In carrying out the reaction it is desirable and even essential for best results, to avoid excessive concentration of unreacted alkylene oxides in the reaction zone, especially in the presence of such strongly alkaline catalysts as sodium or potassium hydroxides or glycollates. It is preferred to supply the ethylene xoide and 1,2-proplylene oxide to the reaction zone at such a rate as to maintain therein a controlled concentration of unreacted oxide which may be kept uniform and constant or varied as needed up to the end of the reaction. To this end, the reaction may be conducted in a closed system and the oxides produced therein at such a rate as to maintain a substantially uniform pressure during the reaction."

It has now been disclosed that utilizing a reverse addition, i.e. a process wherein phosphoric acid is added to alkylene oxide provides polyols with exceptional stability. The use of such a process also provides other advantages such as shorter cycle time. The formation of by-products such as dioxanes and dioxalanes is substantially reduced. With the present process, there is no viscosity increase in the reaction media as occurs with prior art processes which present heat transfer problems and require large-scale mixing equipment. Another advantage is that water white products are easily and consistently obtained, whereas prior art processes require very vigorous stirring and extremely slow oxide addition to obtain such products.

According to the method of the present invention, phosphoric acid is added to an alkylene oxide under reaction conditions to yield a substantially neutral phosphate polyol with enhanced water stability properties. To obtain a neutral product, no more than about 0.18 mol of acid is added per mol of alkylene oxide. Thus, the final product is the adduct of 1 mol of phosphoric acid, and about 5.5 mols or more of alkylene oxide. Preferably, from about 5.6 to 6.5 mols of alkylene oxide are reacted per mole of phosphoric acid.

The reaction is carried out at temperatures of about 0–150° C., preferably at 40–100° C. The reaction is exothermic and usually cooling, in addition to the rate of phosphoric acid addition, is utilized to maintain the proper reaction temperature. After completion of the reaction, volatiles are removed from the reaction mixture by conventional techniques such as heating at elevated temperatures under reduced pressure.

The reaction is carried out under sufficient pressure to maintain the alkylene oxide in a liquid state. Thus, while the pressure may be from one up to about 20–30 atmospheres, the reaction is most conveniently carried out at from slightly above 1 to 3 atmospheres.

While not necessary, a solvent may be utilized in carrying out the reaction. Usable solvents are those that dissolve but do not react with the reactants or products. These include ethers, halogenated hydrocarbons, alkyl phosphates, and phosphonates, etc. A solution of phosphoric acid in the solvent may be added to the alkylene oxide, or phosphoric acid may be added to a solvent solution of the oxide, or a combination of these may be used. Preferably, the reaction is carried out in the absence of solvents.

The alkylene oxides usable in the present invention include, among others, ethylene oxide, propylene oxide, the isomeric normal butylene oxides, hexylene oxide, dodecylene oxide, cyclohexane oxide, etc. Preferably, alkylene oxides containing from 2 to 4 carbon atoms are used. The invention also contemplates mixed polyols having randomly distributed oxyalkylene groups as, for example, obtained by adding phosphoric acid to a mixture of alkylene oxides such as propylene and butylene oxides. It is also possible to obtain a mixed polyol having ordered oxyalkylene groups by first adding the phosphoric acid to one alkylene oxide, followed by reaction of this product with a second alkylene oxide.

The exact reaction mechanism difference involved in the addition of phosphoric acid to alkylene oxide as contrasted with the prior art direct method is not clearly understood. It is clear, however, that the products of this invention are quite different from those produced by the prior art techniques of adding oxide to acid. For example, the products produced by the method of U.S. 2,372,244 are said to be symmetrical polyols having terminal primary hydroxyl groups. In contrast, the products of this invention are unsymmetrical and about one-half of the hydroxyl groups are secondary. A reaction product of the invention obtained by reaction of 1 mol of phosphoric acid with about 6 mols of propylene oxide was subjected to hydrolysis to determine the length of each of the three ester groups. The hydrolysis products were found to be in a ratio of 3.1 mols of propylene glycol, 1.0 mol of dipropylene glycol, 0.8 mol of tripropylene glycol, 0.4 mol of tetrapropylene glycol and 0.3 mol of pentapropylene glycol. Thus, the length of each ester chain varied from 1 to 5 oxypropyl groups. Also, about one-half of the hydroxyl groups with such products are secondary hydroxyl groups.

The reasons for superior hydrolytic stability of the phosphate polyols produced by the process of the present invention are not clearly understood. While not desiring to be bound by theory, one possible explanation is based on the chemical nature of phosphoric acid and the ester linkage resulting therefrom. Anhydrous phosphoric acid exists as an equilibrium mixture as indicated by the following equation:

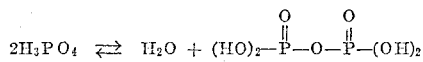

When propylene oxide is added to such a mixture, the oxide is hydrated to glycol by the water of equilibrium and the indicated equilibrium is shifted to the right, increasing the pyrophosphate concentration. The hydration reaction is catalyzed by phosphoric acid which is present in excessive amounts. It is believed that by reversing the addition, i.e. adding acid to oxide, the equilibrium shift is minimized since the oxide is present in a large excess and neutralizes the acid immediately upon addition. Thus, the acid has only a transitory existence and the pyrophosphate concentration is kept at a minimum. The resulting esters of ortho-phosphoric acid are monomeric, each of the three ester groups being bound to phosphorus through an organic P—O—C linkage. In contrast, pyrophosphate esters have two phosphorus atoms per molecule which are joined by the inorganic P—O—P linkage. This linkage is readily susceptible to hydrolysis with the generation of acidic —P—OH groups. In contrast, the organic P—O—C linkages are more resistant to hydrolysis.

Having thus described the invention, the following examples are offered to further illustrate some outstanding features of the process and products of this invention.

Example I 336 parts of propylene oxide was charged to an autoclave and heated to 55° C. Thereafter, 100 parts of 100% phosphoric acid was added to the oxide. The acid was added at a steady rate over a period of four hours and fifty minutes while the temperature was maintained at 52–59° C. with external cooling. During the acid addition, the pressure ranged from 21 to 32 p.s.i.g. After the addition was completed, the reaction mixture was heated at 70° C. for two hours. The mixture was then stripped of volatiles by heating at 80° C., under a pressure of 3–5 mm. of mercury for two hours. The product, a light, clear liquid, had the following properties:

| | |
|---|---|
| Hydroxyl number | 423 |
| Acid number | 0.3 |
| Percent $P_2O_5$ | 16.7 |
| Color (APHA) | 120 |
| Percent volatiles | 0.17 |

Example II

A phosphate polyol was prepared using the technique of the prior art in which the alkylene oxide was added to the phosphoric acid. 100 parts of 100% phosphoric acid was charged to the autoclave reactor. To the acid was added 400 parts of propylene oxide while the temperature was maintained at 65–70°. 25 hours were required for the complete addition of the oxide. During the oxide addition, the pressure ranged from 7 to about 21 p.s.i.g. After completion of the reaction, the mixture was heated at 70° C. for 1½ hours. Volatiles were stripped from the mixture by heating at 80°, under a pressure of 3–10 mm. mercury for two hours. The product, a brownish-black liquid, had the following properties:

| | |
|---|---|
| Hydroxyl number | 393 |
| Acid number | 0.24 |
| Percent $P_2O_5$ | 17.0 |
| Color (APHA) | >700 |
| Percent volatiles | 0.4 |

Example III

The phosphate polyols produced in Examples I and II were incorporated into a premix formulation and utilized in the preparation of polyurethane foam. A series of tests to investigate the hydrolytic stability and foamability of the formulations was carried out. Two components were used: Component A, comprising a mixture of a phosphate polyol, a conventional polyol, a wetting agent, tertiary nitrogen-containing catalyst and a fluorocarbon blowing agent, and Component B, a polyisocyanate. With one series of formulations, special precautions were taken to maintain the formulations in a dry state. With a second series, 0.1% distilled water was added to Component A, the polyol-catalyst mixture, prior to reaction with the polyisocyanate. The compositions of Components A and B were as follows:

Component A: Parts by weight
- Phosphate polyol (from Example I or II) ---- 80
- Pluracol SP-560 [1] Polyol ---------------- 20
- DC-113 [2] -------------------------------- 1.23
- Dabco [3] --------------------------------- 0.98
- FC-11 [4] --------------------------------- 34
- Distilled water --------------------------- 0–0.1

Component B: NCO/OH ratio
- PAPI [5] ---------------------------------- 1.05:1

[1] Sorbitol-propylene oxide adduct having a molecular weight of about 514.
[2] Silicone wetting agent.
[3] 2,2,2-diazabicyclooctane.
[4] Trichloromonofluoromethane.
[5] Polymethylene polyphenylisocyanate.

The foams were prepared by mixing Components A and B in a plastic cup, pouring into a 10″ x 10″ box, and allowing the foaming reaction to go to completion. With one series of tests, the foams were prepared immediately after addition of the water. With a second series, the premix formulations were aged for 14 days prior to being reacted with the polyisocyanate. In carrying out the foaming reactions, the cream time, rise time and tack-free time were observed. The cream time is the time from the start of mixing of the two components until the reaction mixture begins to foam. This is determined by visually noting a change from a clear to a creamy appearance in the mixture. The rise time is the time from the start of mixing until the foam stops rising. The tack-free time is the time from the start of mixing until the foam is non-tacky to the touch. In order to control foam quality, and to coordinate foaming, curing and handling, it is desirable to have these times as low and as consistent as possible. Initial foamability data and also data obtained when the foaming was carried out after a fourteen-day storage of the premix formulations are given in Table 1. Storage of the premix formulation was carried out at room temperature.

TABLE 1.—COMPARISON OF FOAM CHARACTERISTICS OF PREMIX FORMULATIONS

|  | Phosphate Polyol Included in Premix Formulation | | | |
| --- | --- | --- | --- | --- |
|  | Polyol of Example I | | Polyol of Example II | |
| Added water, wt. percent | 0 | 0.1 | 0 | 0.1 |
| Initial Values: | | | | |
| Cream time, sec | 16 | 15 | 13 | 16 |
| Rise time, sec | 58 | 55 | 65 | 70 |
| Tack-free time, sec | OR | OR | OR | OR |
| Aging Time, 14 Days: | | | | |
| Cream time, sec | 24 | 29 | 23 | 300 |
| Rise time, sec | 76 | 101 | 78 | 1,000 |
| Tack-free time, sec | OR | OR | OR | 1,500 |

OR=Tack-free by the time the foam has finished rising.

As shown by the data of Table 1, the foamability properties of the premix formulation containing the product of this invention were essentially unchanged during the storage period in the absence or presence of water. In contrast, the foamability properties of the premix formulation with the prior art phosphate polyol were greatly affected by storage in the presence of water. After a storage period of fourteen days, the cream, rise, and tack-free times increased drastically. In the foam manufacturing operation, the simultaneous occurrence of several phenomena is critical to foam properties. The gaseous blowing agent must be released at the time when the polymer has the proper viscosity. If the viscosity is too high, a very dense and poorly foamed material is obtained, whereas if the viscosity is too low, the foam may collapse totally. Moreover, gas release must be coordinated with the proper amount of cross-linking so that at maximum foam rise the gas is entrapped to form the desired cellular structure. In view of these factors, the ratio of the reactants and catalyst is carefully controlled so to consistently obtain a product with the desired properties. Obviously, the use of a premix formulation subject to variations in cream, rise, and tack-free times would be very objectionable. The expedient of restoring the premix formulation to its original level by adding more catalyst is not only uneconomical, but it is difficult to determine the exact amount of additional catalyst required for optimum and reproducible results.

Example IV

An investigation was carried out to compare the acid number history of a polyol of the present invention stored with water as compared with that of a prior art phosphate polyol similarly stored in water. This study comprised adding 0.2 weight percent water to the phosphate polyols of Examples I and II, heating the mixtures at 80° C. for two hours and then storing at room temperature for twelve days. The acid numbers were determined before the water was added to the polyols, after the heating period, and after twelve days of storage. These data are shown in Table 2.

TABLE 2.—ACID NUMBERS OF PHOSPHATE POLYOLS IN THE PRESENCE OF 0.2% ADDED WATER

|  | Polyol of Example I | | Polyol of Example II | |
| --- | --- | --- | --- | --- |
|  | Acid No. | Percent Increase | Acid No. | Percent Increase |
| Before water addition | 0.28 |  | 0.30 |  |
| After heating at 80° C. for 2 hours | 0.23 | −18 | 0.33 | 10 |
| After 12 days storage | 0.54 | 93 | 1.35 | 350 |

As shown by the above data, the acid number increase of the prior art polyol in the presence of 0.2% water was much more pronounced than was the acid number increase of the phosphate polyols of this invention. The high acid number is indicative of hydrolysis of the polyol with the generation of acid groups.

Example V 98 grams (1.00 mol) of 100% phosphoric acid is added dropwise to a mixture of 220 grams of ethylene oxide and 216 grams of butylene oxide at reflux temperature (23°) with stirring. After addition is complete, the reaction mixture is heated at 60° C. for one hour. The mixture is then stripped of volatiles by heating at 80° C. under 1 mm. Hg pressure for two hours. The resulting phosphate polyol contains both oxyethylene and oxybutylene groups.

In carrying out the process of the invention, anhydrous or dilute phosphoric acids may be used, i.e. the acid may contain from above 80 to 100% $H_3PO_4$. Preferably, anhydrous phosphoric acids containing substantially 100% $H_3PO_4$ are used.

The phosphate polyols of this invention as described above have been found to be very useful as constituents of polyurethane foams to impart flame retardancy thereto. They are also useful as plasticizers for vinyl-type resins and for use in functional fluids.

We claim:
1. A mixture of substantially neutral, unsymmetrical phosphate polyols obtained by addition of phosphoric acid to an alkylene oxide in the liquid phase at a temperature of about 0° to 150° C., said phosphoric acid containing from 80% to 100% $H_3PO_4$ and being added in an amount not greater than 0.18 mol per mol of alkylene oxide and said alkylene oxide being selected from ethylene oxide, propylene oxide, isomeric normal butylene oxides, hexylene oxide, dodecylene oxide, cyclohexane oxide, and mixtures thereof.

2. Substantially neutral phosphate polyols obtained by addition of essentially 100% phosphoric acid to propylene oxide in the liquid phase at a temperature of about 0° to 150° C., said acid being added in an amount less than 0.18 mol per mol of propylene oxide.

3. A process of preparing a substantially neutral, unsymmetrical phosphoric acid ester comprising adding phosphoric acid to alkylene oxide in the liquid phase at a temperature of from about 0° to 150° C., said phosphoric acid containing from 80% to 100% $H_3PO_4$ and being added in an amount not in excess of 0.18 mol per mol of alkylene oxide, and said alkylene oxide being selected from ethylene oxide, propylene oxide, isomeric normal butylene oxides, hexylene oxide, dodecylene oxide, cyclohexane oxide, and mixtures thereof.

4. The process of preparing a phosphoric acid polyol comprising adding essentially 100% phosphoric acid to propylene oxide in the liquid phase at a temperature of from about 0° to 150° C., said acid being added in an amount not greater than about 0.18 mol per mol of propylene oxide.

References Cited
UNITED STATES PATENTS 3,099,676   7/1963   Lanham _____ 260—978 X CHARLES B. PARKER, *Primary Examiner.*

A. H. SUTTO, *Assistant Examiner.*